US008589739B2

(12) United States Patent
Kodha et al.

(10) Patent No.: US 8,589,739 B2
(45) Date of Patent: Nov. 19, 2013

(54) PRODUCT LIMITATIONS ADVISORY SYSTEM

(75) Inventors: Sachin Kodha, Uttar Pradesh (IN); Bharat Punjalal Shah, Bangalore (IN); Pallavi Singh, Haryana (IN)

(73) Assignee: International Business Machines Corporation, Armonk, NY (US)

( * ) Notice: Subject to any disclaimer, the term of this patent is extended or adjusted under 35 U.S.C. 154(b) by 423 days.

(21) Appl. No.: 12/404,805

(22) Filed: Mar. 16, 2009

(65) Prior Publication Data

US 2010/0235738 A1 Sep. 16, 2010

(51) Int. Cl.
*G06F 11/00* (2006.01)

(52) U.S. Cl.
USPC .......................................................... 714/46

(58) Field of Classification Search
USPC .......................................................... 714/46
See application file for complete search history.

(56) References Cited

U.S. PATENT DOCUMENTS

| | | | | |
|---|---|---|---|---|
| 6,161,135 | A | 12/2000 | Ehrlich | |
| 7,191,364 | B2 * | 3/2007 | Hudson et al. | 714/38.11 |
| 7,685,570 | B2 * | 3/2010 | Draine et al. | 717/125 |
| 7,930,681 | B2 * | 4/2011 | Kloeffer et al. | 717/120 |
| 7,984,304 | B1 * | 7/2011 | Waldspurger et al. | 713/187 |
| 2004/0068677 | A1 * | 4/2004 | Briskey et al. | 714/38 |
| 2004/0078689 | A1 * | 4/2004 | Knuutila et al. | 714/38 |
| 2005/0021655 | A1 * | 1/2005 | Liu et al. | 709/213 |
| 2005/0120273 | A1 * | 6/2005 | Hudson et al. | 714/38 |
| 2006/0041843 | A1 | 2/2006 | Billsus | |
| 2006/0184829 | A1 * | 8/2006 | Cheong et al. | 714/39 |
| 2007/0168991 | A1 * | 7/2007 | Greenberg et al. | 717/127 |
| 2007/0220475 | A1 | 9/2007 | Asahara | |
| 2008/0028371 | A1 * | 1/2008 | Brothers et al. | 717/136 |
| 2008/0034351 | A1 * | 2/2008 | Pugh et al. | 717/128 |
| 2008/0256517 | A1 * | 10/2008 | Atkin et al. | 717/124 |
| 2009/0138854 | A1 * | 5/2009 | Mani | 717/124 |
| 2009/0158099 | A1 * | 6/2009 | Cui | 714/57 |
| 2010/0174691 | A1 * | 7/2010 | Caldwell et al. | 707/696 |

FOREIGN PATENT DOCUMENTS

| | | | |
|---|---|---|---|
| EP | 1052580 | A1 | 11/2000 |
| WO | WO 0127847 | A1 | 4/2001 |

OTHER PUBLICATIONS

Microsoft Help and Support Knowledgebase—http://support.microsoft.com/search/?adv=1, available as of Dec. 13, 2010, 1 page.
IBM Support and download documentation—http://www.ibm.com/support/documentation/us/en/?cm_re=other-_suprcn-_-documentation, available as of Dec. 13, 2010, 2 pages.
IBM Help System for WebSphere Application Server—http://publib.boulder.ibm.com/infocenter/wasinfo/v5r0/index.jsp, available as of Dec. 13, 2010, 2 pages.
Nokia Product Advisory—http://batteryreplacement.nokia.com/batteryreplacement/en/, available as of Dec. 13, 2010, 3 pages.

(Continued)

*Primary Examiner* — Michael Maskulinski
*Assistant Examiner* — Neil Miles
(74) *Attorney, Agent, or Firm* — Ference & Associates LLC

(57) ABSTRACT

A system that automatically prompts a computer user about a known limitation of a product component, such as a software component. Generally, there is contemplated herein a method including providing a physical computing device, running software in the physical computing device, detecting whether the software has a known limitation, and automatically providing an advisory responsive to detecting a known software limitation.

16 Claims, 5 Drawing Sheets

(56) References Cited

OTHER PUBLICATIONS

Cisco Security Advisory—http://www.cisco.com/en/US/products/products_security_advisory09186a00807cb157.shtml, available as of Dec. 13, 2010, 2 pages.
Interpreting Defect Logs—http://msdn2.microsoft.com/en-us/library/as468746.aspx, available as of Dec. 13, 2010, 1 page.
Common Base Event—http://ibm.com/developerworks/library/specifiations/ws-cbe/, available as of May 24, 2011, 2 pages.
Developer's Guide, Autonomic Computing Tasks—http:/www.ibm.com/developerworks/autonomic/books/fpy0mst.htm#HDRAPPA, available as of May 24, 2011, 57 pages.
Oasis Standard, "Management Using Web Services (MUWS 1.1), Part 1 and Part 2", Copyright OASIS 2003-2006, 83 pages.

* cited by examiner

PRODUCT LIMITATIONS ADVISORY SYSTEM

BACKGROUND

Software products for computers quite often arrive in the customer's hands far from being bug-free or perfect. It is virtually unheard of, in other words, for a software product or package not to arrive with some known or unknown limitations. The known limitations are usually documented and made available to the users through various modes of documentation by the product companies. Particularly, software product companies normally provide detailed documentation about the product features and the known limitations, and such information is usually provided in the form of digital media and also is made available on product support websites.

A typical user faces several challenges when s/he encounters a problem. Generally, the user needs to be aware of all of the various modes of documentation offered by the product company and must browse through voluminous documentation. The problem at hand might be listed and the user finds it easily, or it might be listed and the user may not be able to locate it. In a worst-case scenario, the limitation causing the problem is not even listed.

Referring now to FIG. 1, which provides a basic "decision" flow diagram corresponding to just these situations, and with specific reference to the numerals found in the diagram, the challenges mentioned above can easily lead to the following scenarios:

(1') The user is not aware of where to look for resolution, and hence logs a call to a product support center.

(2a) The result is a "win-win" situation for the user and the product company.

(2b) The user's phone call results in the support center finding the listed limitation, with a favorable response back to the user.

(2c) The user's phone call necessitates the support center's consulting of other individuals or teams by way of resolving the problem.

Clearly, situations (1) and (2b) entail unnecessary calls to a product support center, resulting in a loss of time for both the user as well as the product company, meaning greater costs to the company and dissatisfaction for the user. Further, while (2a) is a desirable scenario for the company, (2c) is of great concern to the company and user alike.

SUMMARY

Broadly contemplated herein, this disclosure describes a system that automatically prompts the user about a known limitation of a product component.

In summary, this disclosure describes a method including executing software on a physical computing device, detecting whether the software has a known limitation, and on detecting that the software has a known limitation, providing an advisory response addressing the limitation.

This disclosure also describes an apparatus including a physical computing device, a detector which detects whether software at the physical computing device has a known limitation, and an advisor which provides, upon a detection by the detector that the software has a known limitation, provides an advisory response addressing the limitation.

Furthermore, this disclosure additionally describes a program storage device readable by machine, tangibly embodying a program of instructions executable by the machine to perform a method including executing software on a physical computing device, detecting whether the software has a known limitation, and on detecting that the software has a known limitation, providing an advisory response addressing the limitation.

DETAILED DESCRIPTION

It will be readily understood that embodiments of the invention, as generally described and illustrated in the Figures herein, may be arranged and designed in a wide variety of different configurations. Thus, the following more detailed description of the embodiments of the invention, as represented in FIGS. 1-5, is not intended to limit the scope of the invention, as claimed.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of the embodiments of the invention. One skilled in the art will recognize, however, that embodiment of the invention can be practiced without one or more of the specific details, or with other methods, components, materials, etc. In other instances, well-known structures, materials, or operations are not shown or described in detail to avoid obscuring aspects of embodiments of the invention.

The illustrated embodiments of the invention will be best understood by reference to the drawings, wherein like parts are designated by like numerals or other labels throughout. The following description is intended only by way of example, and simply illustrates certain selected embodiments of devices, systems, and processes.

Figure 1:
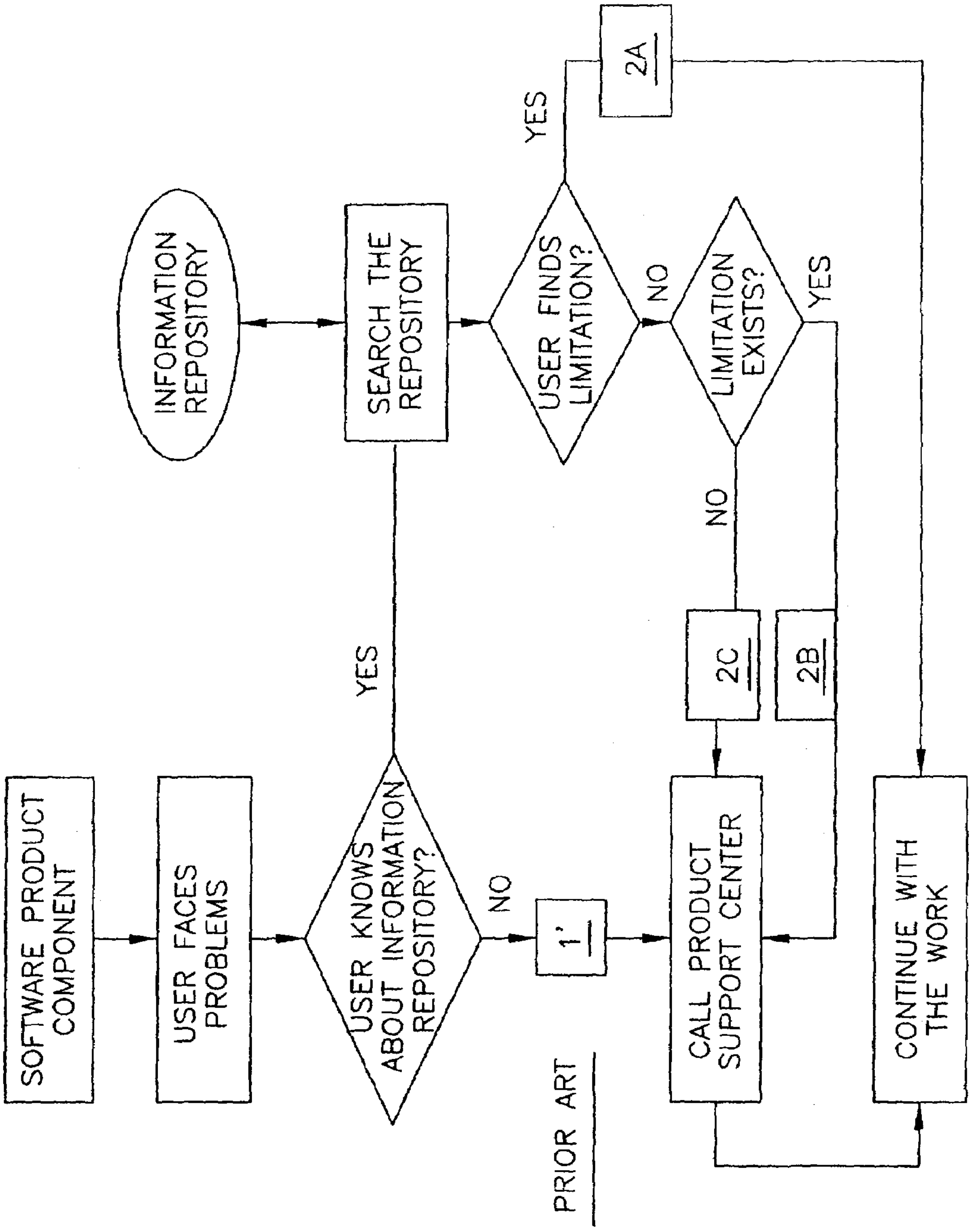
FIG. 1 schematically depicts a conventional example of a user's decision tree in connection with computer software limitations.
Figure 2:
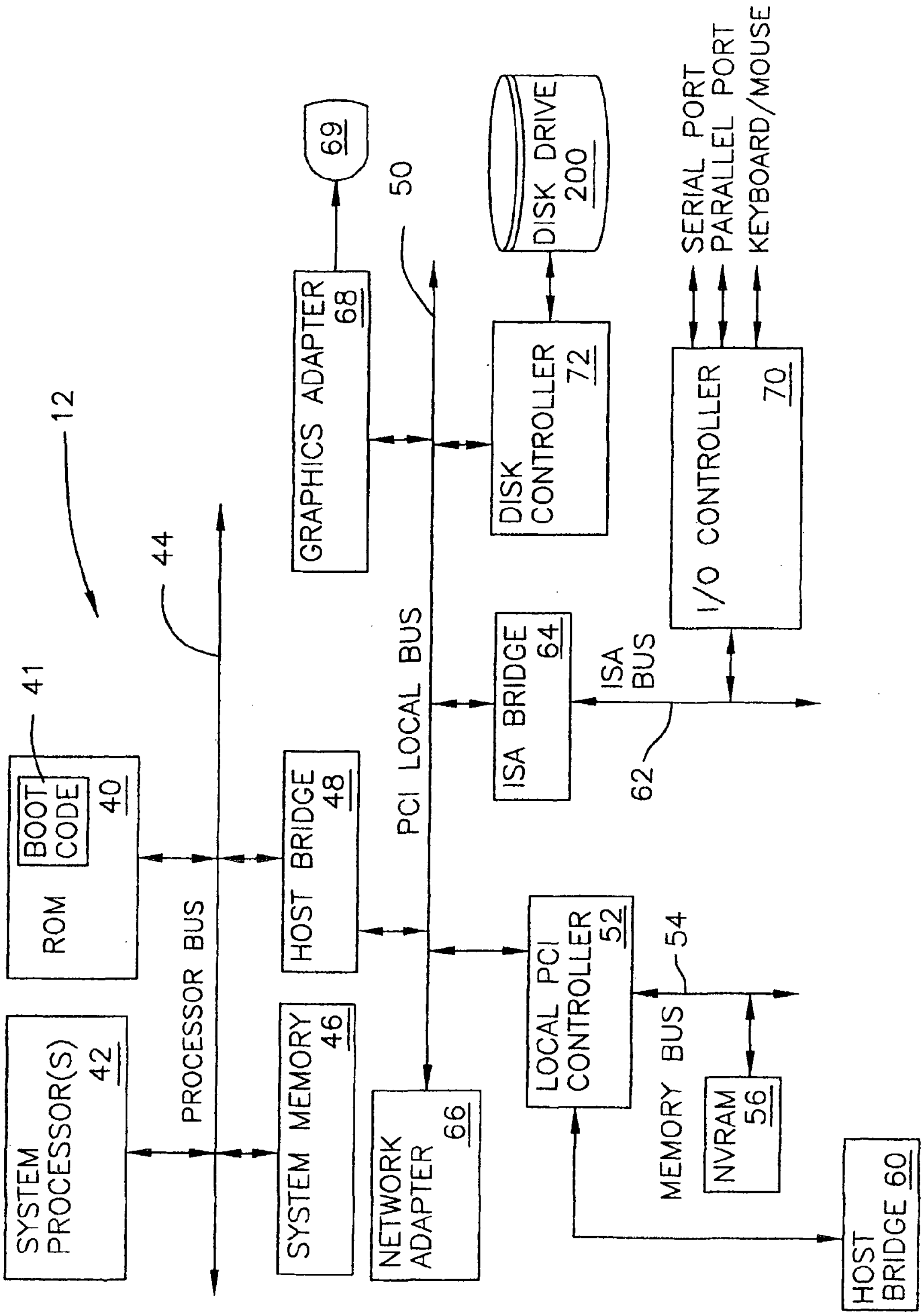
FIG. 2 illustrates an exemplary embodiment of a computer system.

Referring now to FIG. 2, there is depicted a block diagram of an embodiment of a computer system 12. The embodiment depicted in FIG. 2 may be a notebook computer system, such as one of the ThinkPad® series of personal computers previously sold by the International Business Machines Corporation of Armonk, N.Y., and now sold by Lenovo (US) Inc. of Morrisville, N.C.; however, as will become apparent from the following description, the embodiments of the invention may be applicable to any data processing system. Notebook computers, as may be generally referred to or understood herein, may also alternatively be referred to as "notebooks", "laptops", "laptop computers" or "mobile computers".

As shown in FIG. 2, computer system 12 includes at least one system processor 42, which is coupled to a Read-Only Memory (ROM) 40 and a system memory 46 by a processor bus 44. System processor 42, which may comprise one of the AMD™ line of processors produced by AMD Corporation or a processor produced by Intel Corporation, is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 12 to a local area network (LAN), and graphics adapter 68, which interfaces computer system 12 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 12 further includes Industry Standard Architecture (ISA) bus 62, which is coupled to PCI local bus 50 by ISA bridge 64. Coupled to ISA bus 62 is an input/output (I/O) controller 70, which controls communication between computer system 12 and attached peripheral devices such as a keyboard and mouse. In addition, I/O controller 70 supports external communication by computer system 12 via serial and parallel ports, including communication over a wide area network (WAN) such as the Internet. A disk controller 72 is in communication with a disk drive 200 for accessing external memory. Of course, it should be appreciated that the system 12 may be built with different chip sets and a different bus structure, as well as with any other suitable substitute components, while providing comparable or analogous functions to those discussed above.

Figure 3:
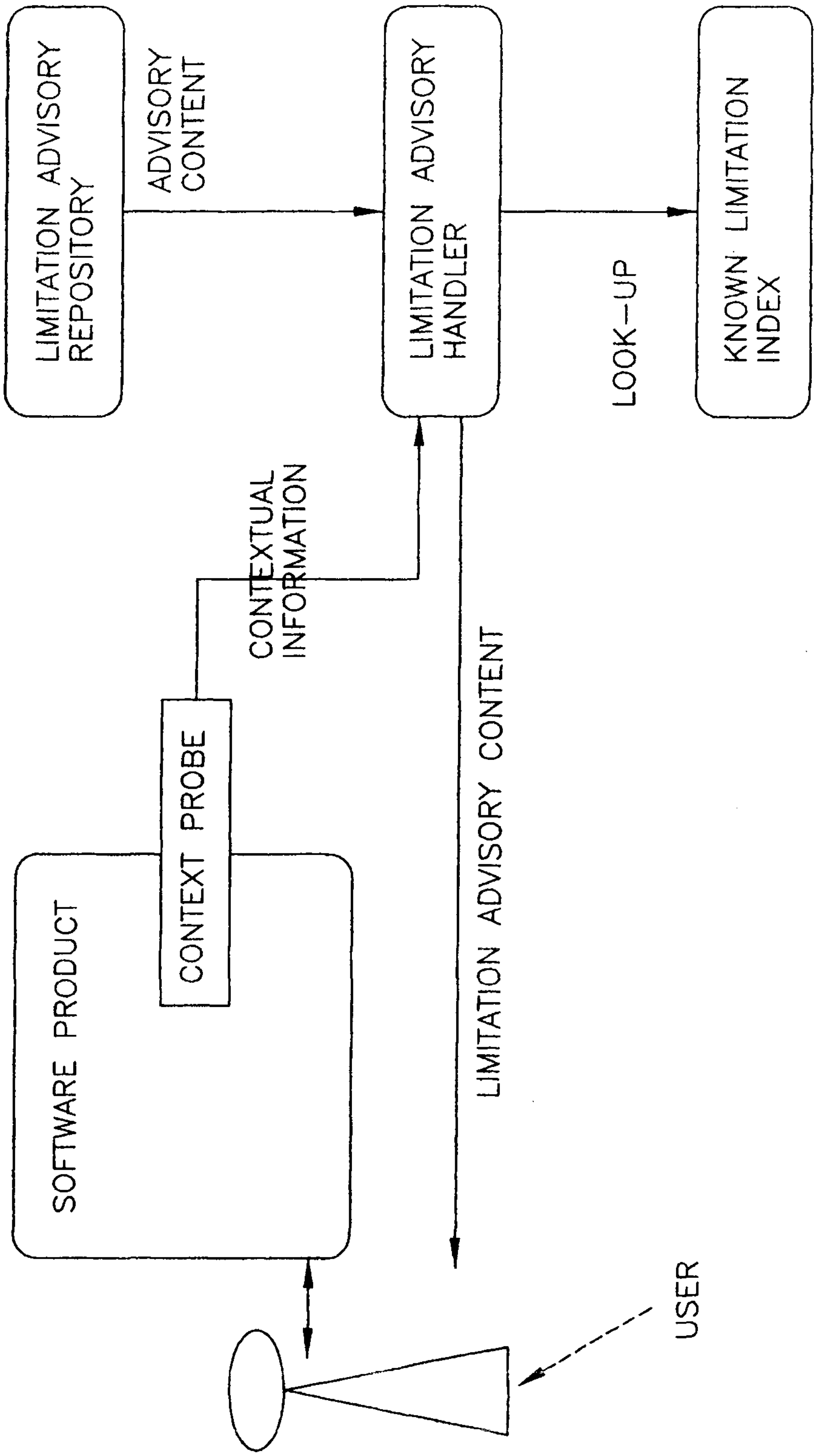
FIG. 3 schematically depicts an exemplary embodiment of a general framework for providing a product limitation advisory.
Figure 4:
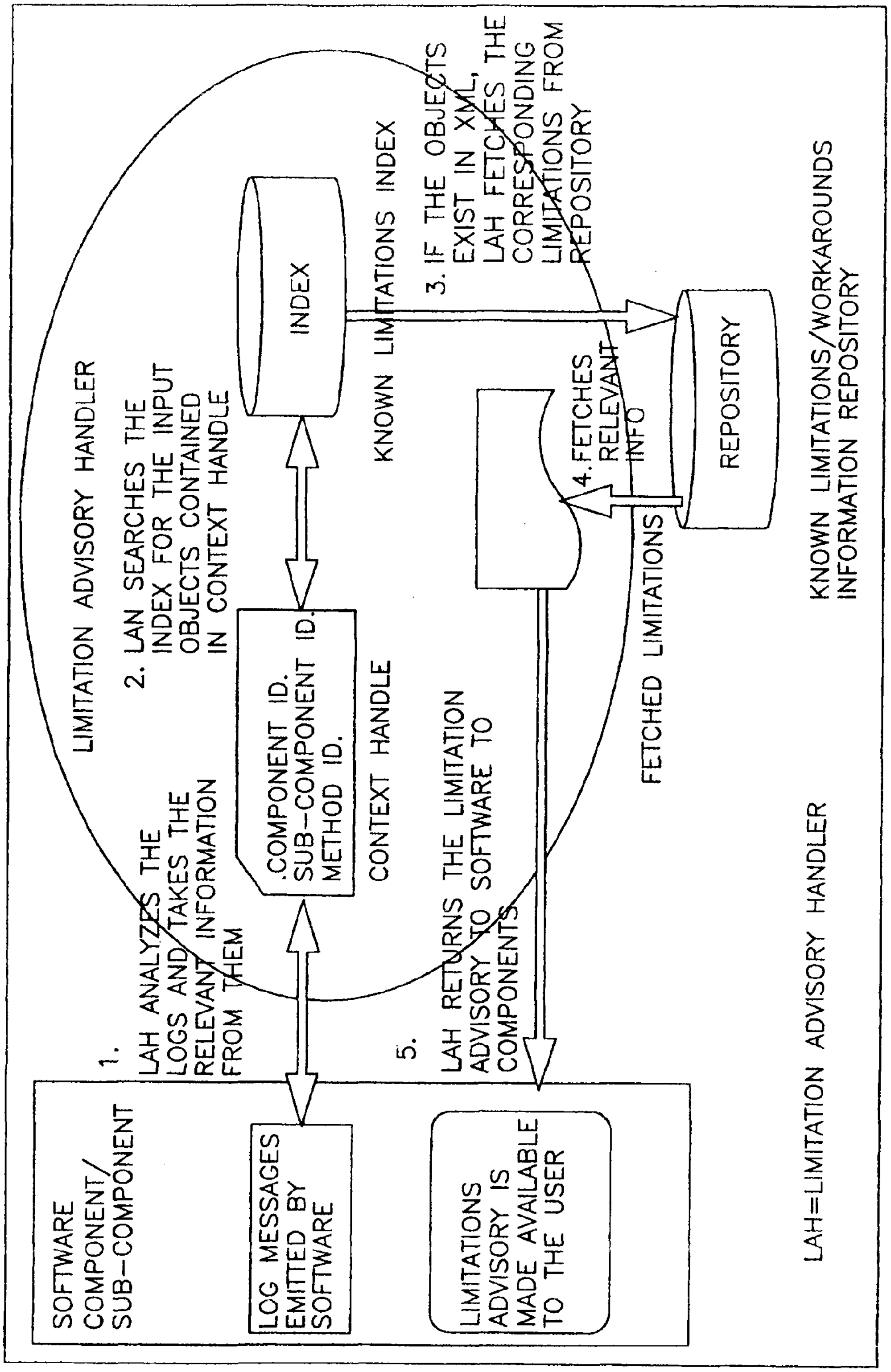
FIG. 4 schematically illustrates an exemplary embodiment a detailed process for providing a product limitation advisory.
Figure 5:
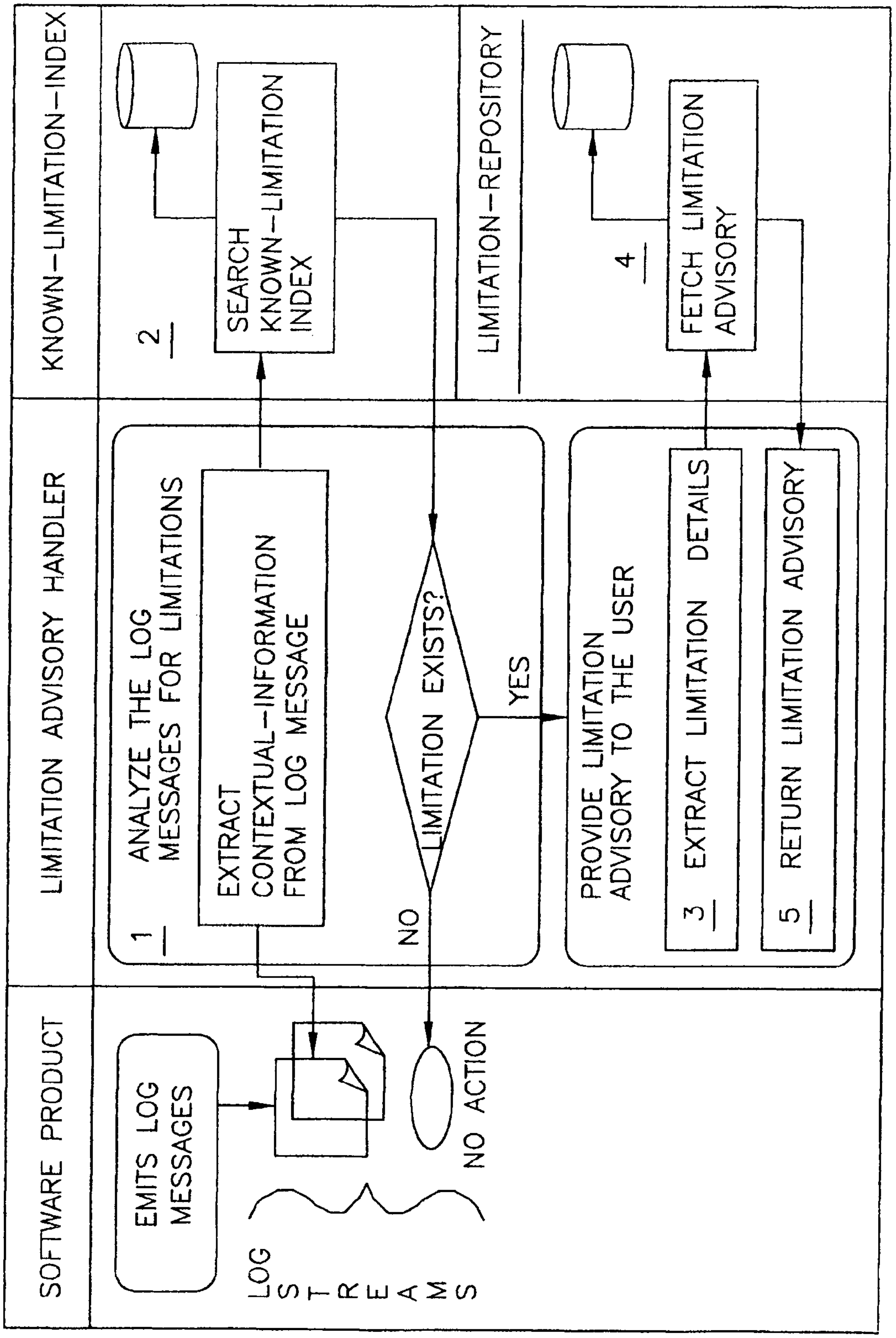
FIG. 5 schematically depicts an exemplary embodiment a detailed makeup of a limitation advisory handler.

It should be understood that the processes and arrangements broadly contemplated in accordance with FIGS. 3-5 can be applied to a very wide range of computer systems, including that indicated at 12 in FIG. 2.

Generally, embodiments of the invention broadly embrace a capability to autonomically refer to a product limitation repository in-line and provide to a user a contextually accurate product limitation advisory as needed. ("Autonomically" here refers to self-managing computer systems.) In other words, an advisory for any known limitation is looked up and then reported to the user proactively, thereby avoiding unnecessary consults with support staff as described heretofore. Further, embodiments of the invention can conceivably also embrace an ability to analyze the problems reported for the product in an off-line mode and refer to a product limitation repository and provide a contextually accurate product limitation advisory.

Generally, while software product companies endeavor to remove all possible defects from their software products, and have various processes to help them do so, it is universally accepted that software products are released to the market with some defects unresolved. However, companies can and do continue to make genuine efforts to find such defects during the product life cycle and, where possible, document them as known limitations and offer workarounds in many cases to minimize the hardship for the users.

Typically, defects can be detected by a company at a testing phase, before formal release to the market, or at a post-release phase, when problems are reported by customers. At the testing phase, when a defect is detected, a test team or development team could effect any one of the following outcomes:

(a) The defect is fixed.

(b) The defect cannot be fixed due to some dependencies (e.g., one defect might be dependent on another being fixed).

(c) A decision is made to defer fixing until the next release, due to resource & time constraints.

On the other hand, at the post-release phase, the following typical outcomes can be effected:

(d) The defect is fixed to resolve the customer's problem and the fix is provided to the customer.

(e) The defect cannot be fixed due to some dependencies and, hence, the customer is offered some workaround.

Limitations (b), (c) and (e) above are regarded as "known limitations" and can typically be documented in an information-repository and published for end-user consumption by the software product companies.

In the framework discussed heretofore, a system in accordance with an embodiment of the invention may very generally comprise the following elements as illustrated in FIG. 3: Software Product, Context Probe, Limitation Advisory Handler, Known Limitation Index, Limitation Advisory Repository.

Typically, a software product is aware of the context in which product component is being used. At a high level, then, a method in accordance with an embodiment of the invention may involve the collecting of a Context Probe, and then communicating contextual information to a Limitation Advisory Handler (LAH).

The LAH can then perform a lookup in a known-limitation-index to dynamically analyze the contextual information at hand to detect the presence of any known limitation while using the software product in such a context. Accordingly, if a match is found in the index, a corresponding limitation advisory can be obtained from the product-limitation-repository, and the limitation advisory can then be presented to the user.

This limitation advisory can be used, among other things to:

- warn the user in-advance about a likely problem/limitation that the user may face under some conditions while using the product component;
- eliminate the need for the user to refer to the product documentation if and when the user faces a known problem; and
- eliminates an avoidable call/service-request by the user to a product support center.

Turning now to some details of components and process steps within the general framework presented hereinabove, and with reference to FIG. 4, a context-probe can be visualized as an extension of a log-and-trace functionality of a software product. A typical log/trace probe in a software-product will send a log message to a log-and-trace component with the log-levels (as, e.g., DEBUG, INFO, WARNING, or FATAL). A log-and-trace component will prepare a log message and record it in a log file. The log file is a seamless and non-intrusive medium for communicating to a user the status of a software-product. In accordance with at least one embodiment of the invention, this log/trace probe can be extended by introducing an additional log-level as "LIMITATION". A more detailed working of the LAH may be appreciated from FIG. 5, and this can be referred to concurrently with FIG. 4 in the detailed process discussion herebelow. (FIG. 5 contains numbered process steps 1-5 similar to and consistent with those found in FIG. 4.)

In accordance with at least one embodiment of the invention, a log message can employ common logging formats such as Common Base Event (CBE) or the WSDM Event Format (WEF). The log and trace analyzer may be designed to understand these formats. In addition, the format can contain contextual information as illustrated in the box below.

```
[<Date-Time Stamp>] <Contexual Information> L LIMITATION:
<Context Description >
For Example:
[1/18/08 15:44:28:968 IST] PDM doConversion-pdf-rte L Limitation :
Convert pdf file to Rich Text Editor
```

The contextual information in a log-message (such as CBE) may accordingly include the following: creationTime, reporterComponentId, sourceComponentId, situation, contextDataElements, associatedEvents Referring now to step 1 in FIG. 4, the presence of a limitation while using the product can be recognized by analyzing the log-message streams. As such, the LAH can be implemented as an extension to the log & trace analyzer. It can analyze the logs and filters out the messages having log level as "LIMITATION".

If a match is found in the known-limitations-index, then in accordance with further steps in FIG. 4: the contextual-information from the log message can be used to search on the known-limitation-index (step 2); the corresponding Limitation Advisory content from the Product Limitation Repository can be fetched (step 3); and the Limitation Advisory content can be provided to the relevant software component (step 4) that will then present the limitation advisory content to the user (step 5).

To elaborate further, the known-limitations-index may essentially serve as the matchmaker between contextual-information and the limitations advisory content documented in the repository. In its simplest form, the known-limitation-index can contain the contextual-information and the URI to the limitation advisory (documented in the repository) as illustrated in the box below.

```
{
  "Context Handle",
  url/doc link,
}
For example:
<context-information info="doConversion-pdf-rte">
  <url value="http://w3.ibm.com/w3odw/spg/index_default.html"></url>
</ context-information>
```

For its part, the limitation advisory repository can be implemented as a content repository. This repository will contain the description of the limitation, and the workaround/advisory for the user of the product. In its simplest form, it is an indexed collection of HTML pages.

In matching contextual information with the known-limitation-index (step 2), a simple string-matching of contextual-information in the log message and the context-information in the known-limitation-index can be employed.

In the context of obtaining a limitation advisory (steps 3 and 4), it can be assumed that a URL (in the known-limitation-index) is used to fetch the limitation advisory from the limitation advisory repository.

In presenting the limitation advisory to the end-user (step 5), a browser-application or a message box (for a GUI [graphical user interface] application) can be used to display the limitation advisory.

It should be understood and appreciated that a limitation advisory handler employing a log and trace analyzer is but one of the ways via which embodiments of the present invention can readily be employed.

Among the very many positive benefits that can be attained via employing embodiments of the present invention is the idea that users do not have to search for information on product limitations but instead have such information provided to them proactively. This helps ensure that the user will be forewarned even before he/she uses a product and can be made aware of any workarounds that might exist.

It is to be understood that the disclosure, in accordance with at least one embodiment, includes elements that may be implemented on at least one general-purpose computer running suitable software programs. These may also be implemented on at least one Integrated Circuit or part of at least one Integrated Circuit. Thus, it is to be understood that the disclosure may be implemented in hardware, software, or a combination of both.

Generally, embodiments may take the form of an entirely hardware embodiment, an entirely software embodiment or an embodiment containing both hardware and software elements. An embodiment that is implemented in software may include, but is not limited to, firmware, resident software, microcode, etc.

Furthermore, embodiments may take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system, (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Generally, although illustrative embodiments of the present invention have been described herein with reference to the accompanying drawings, it is to be understood that the invention is not limited to those precise embodiments.

What is claimed is:

1. A method comprising:

executing a software product having context probes on a physical computing device, wherein a context probe indicates a feature of said software product as determined from a log and trace functionality of the software product, software product including a known limitation upon release of the software product to market;

detecting the known limitation responsive to issuance of a context probe associated with a feature of the software product; and thereupon providing an advisory response addressing the known limitation;

the context probe being configured to:

employ a log and trace functionality comprising a capability to transmit a lot message for communicating a status of the software product, the log message indicating at least one log level selected from among at least one preestablished log level; and extend the log and trace functionality via adding a limitation log level to the at least one preestablished log level.

2. The method according to claim 1, wherein the advisory response is provided without any human intervention proactively in advance of encountering a known limitation.

3. The method according to claim 1, further comprising:

accessing an index of known limitations maintained in a repository at a remote device and updated with additional known limitations;

said step of detecting comprising querying the known-limitation index based on a received context probe to ascertain the existence of a known limitation.

4. The method according to claim 3, wherein said step of providing an advisory response comprises fetching from the repository an advisory regarding the known limitation.

5. The method according to claim 4, wherein said step of fetching an advisory comprises employing an element in the index; and wherein said step of employing an element comprises employing a URL in the index.

6. The method according to claim 1, wherein said step of detecting comprises obtaining, via use of a context probe, contextual information regarding use of the software product at the physical computing device; and querying for a known limitation matching said context probe used to obtain contextual information.

7. A non-transitory program storage device readable by machine embodying a program of instructions executable by the machine to perform a method comprising:

executing a software product having context probes on a physical computing device, wherein a context probe indicates a feature of said software product as determined from a log and trace functionality of the software product, the software product including, a known limitation upon release of the software product to market;

detecting the known limitation responsive to issuance of a context probe associated with a feature of the software product; and thereupon providing an advisory response addressing the known limitation;

the context probe being configured to:

employ a log and trace functionality comprising a capability to transmit a log message for communicating a status of the software product, the log message indicating at least one log level selected from among at least one preestablished log level; and extend the log and trace functionality via adding a limitation log level to the at least one preestablished log level.

8. The program storage device according to claim 7, wherein the advisory response is provided without any human intervention proactively in advance of encountering a known limitation.

9. The program storage device according to claim 7, wherein said method further comprises:

accessing an index of known limitations maintained in a repository at a remote device and updated with additional known limitations;

said step of detecting comprising querying the index based on a received context probe to ascertain the existence of a known limitation.

10. The program storage device according to claim 7, wherein at least one known limitation is included in a release of said software product.

11. An apparatus comprising:

at least one processor configured to execute, via a non-transitory medium, a software product having context probes, wherein a context probe indicates a feature of said software product as determined from a log and trace functionality of the software product, the software product including a known limitation upon release of the software product to market;

a detector configured to, responsive to receiving a context probe, detect if one or more known limitations for the software product exist in a repository based on said context probe; and an advisor configured to, responsive to determining one or more known limitations for said software product exist in said repository based on said context probe, issue one or more advisory responses addressing the one or more known limitations;

wherein at least one known limitation in said repository is identified after release of the software product the context probe being configured to:

employ a log and trace functionality comprising a capability to transmit a log message for communicating a status of the software product, the log message indicating at least one log level selected from among at least one preestablished log level; and extend the log and trace functionality via adding a limitation log level to the at least one preestablished log level.

12. The apparatus according to claim 11, wherein said advisor provides the one or more advisory responses without any human intervention proactively in advance of encountering a known limitation.

13. The apparatus according to claim 11, wherein said detector is further configured to access an index of known limitations maintained in a repository at a remote device and updated with additional known limitations; and query the known-limitation index based on a received context probe to ascertain the existence of a known limitation.

14. The method according to claim 1, wherein the at least one preestablished log level includes at least one of: a debug log level, an info log level, a warning log level and a fatal log level.

15. The non-signal program storage device according to claim 7, wherein the at least one preestablished log level includes at least one of: a debug log level, an info log level, a warning log level and a fatal log level.

16. The apparatus of claim 11, wherein the at least one preestablished log level includes at least one of: a debug log level, an info log level, a warning log level and a fatal log level.

* * * * *